United States Patent
Lee et al.

(10) Patent No.: US 11,494,725 B2
(45) Date of Patent: Nov. 8, 2022

(54) SYSTEMS AND METHODS FOR QUALITY CONTROL OF WORKER BEHAVIOR USING A NON-LINEAR FAULT SCORING SCHEME

(71) Applicant: COUPANG CORP., Seoul (KR)

(72) Inventors: Yulhee Lee, Seoul (KR); Yonghee Lee, Seoul (KR); Hyung Lee, Seoul (KR); Hoyeon Bae, Seoul (KR); Jaebong Sung, Seoul (KR); Dukwon Nam, Seoul (KR); Sangseok Lee, Seoul (KR); Kyoungwook Lee, Seoul (KR); Yeonjung Jo, Seoul (KR); Seungjin Oh, Seoul (KR); Yeongsoo Kim, Seoul (KR); Moonjung Jang, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/241,114

(22) Filed: Apr. 27, 2021

(65) Prior Publication Data

US 2021/0295236 A1 Sep. 23, 2021

Related U.S. Application Data

(63) Continuation of application No. 16/821,661, filed on Mar. 17, 2020, now Pat. No. 11,030,566.

(51) Int. Cl.
  *G06Q 10/06* (2012.01)
  *G06Q 10/08* (2012.01)

(52) U.S. Cl.
  CPC ... *G06Q 10/06398* (2013.01); *G06Q 10/0835* (2013.01)

(58) Field of Classification Search
  CPC .......................................... G06Q 10/00–50/00
  (Continued)

(56) References Cited

U.S. PATENT DOCUMENTS 5,111,391 A * 5/1992 Fields ................ G06Q 10/1093
                                                    705/7.14
5,117,353 A * 5/1992 Stipanovich ....... G06Q 30/0201
                                                    705/7.29
(Continued)

FOREIGN PATENT DOCUMENTS

AU      201310244 A4    10/2013
CN      104408613 A      3/2015
(Continued)

OTHER PUBLICATIONS

Liu, Qin, "The Research on Regional Logistics Networks System and Its Collaborative Operation," China Doctoral Dissertations (Chapter 6 and Abstract) (30 pages).
(Continued)

*Primary Examiner* — Alan S Miller
(74) *Attorney, Agent, or Firm* — Finnegan, Henderson, Farabow, Garrett & Dunner, LLP

(57) ABSTRACT

Systems and methods for quality control of worker behavior are disclosed. The systems and methods may be configured for: receiving a data set associating a plurality of violations with a plurality of delivery sites, wherein each violation in the plurality of violations is associated with a delivery site and the violations are organized into one or more violation categories; filtering the data set to obtain a subset of violations reflective of a current worker behavior; for each violation category, identifying a first violation from the filtered data set associated with the violation category, the first violation being associated with a highest penalty; determining a rating based on the first violation identified for each violation category; and transmitting the rating to a remote device associated with a delivery worker responsible for the violations.

20 Claims, 11 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 5,117,535 | A * | 6/1992 | Fehrer | D04H 1/74 19/302 |
| 5,325,292 | A * | 6/1994 | Crockett | H04M 3/36 705/7.18 |
| 6,049,776 | A * | 4/2000 | Donnelly | G06Q 10/105 705/320 |
| 6,499,657 | B1 | 12/2002 | Van Abeelen et al. | |
| 6,732,079 | B1 * | 5/2004 | Kintner | G06Q 10/04 705/7.13 |
| 6,823,315 | B1 * | 11/2004 | Bucci | G06Q 10/06 705/7.21 |
| 7,313,530 | B2 * | 12/2007 | Smith | G06Q 10/06 705/7.24 |
| 7,363,126 | B1 * | 4/2008 | Zhong | G01C 21/3484 701/25 |
| 8,306,839 | B2 * | 11/2012 | Deich | G06Q 10/06 705/7.17 |
| 8,473,528 | B2 * | 6/2013 | Lamm, Sr. | G06Q 10/06 707/999.107 |
| 9,488,484 | B2 * | 11/2016 | Lord | G01C 21/34 |
| 10,255,577 | B1 * | 4/2019 | Steves | G05D 1/0212 |
| 10,445,685 | B2 * | 10/2019 | Bhatia | G06F 3/0481 |
| 2002/0165729 | A1 * | 11/2002 | Kuebert | G06Q 10/0833 705/338 |
| 2003/0055706 | A1 * | 3/2003 | Statfeld | G06Q 10/063112 705/7.29 |
| 2005/0021384 | A1 * | 1/2005 | Pantaleo | G06Q 10/06 705/7.22 |
| 2008/0147473 | A1 * | 6/2008 | Zhong | G01C 21/3484 701/25 |
| 2013/0013369 | A1 * | 1/2013 | Deich | G06Q 10/06 705/7.25 |
| 2013/0159209 | A1 | 6/2013 | Zhao et al. | |
| 2013/0290200 | A1 | 10/2013 | Singhal et al. | |
| 2014/0279654 | A1 * | 9/2014 | Lievens | G06Q 10/083 705/333 |
| 2014/0297555 | A1 * | 10/2014 | Kawano | G06Q 10/0837 705/340 |
| 2014/0330738 | A1 * | 11/2014 | Falcone | G06Q 10/08355 705/338 |
| 2015/0178678 | A1 * | 6/2015 | Carr | G06Q 10/0838 705/341 |
| 2015/0228004 | A1 * | 8/2015 | Bednarek | G06Q 30/0633 705/26.8 |
| 2015/0269514 | A1 | 9/2015 | Gittings et al. | |
| 2015/0323332 | A1 * | 11/2015 | Lord | G06Q 50/30 701/408 |
| 2016/0364823 | A1 * | 12/2016 | Cao | G01C 21/3438 |
| 2019/0188637 | A1 | 6/2019 | Endo et al. | |

FOREIGN PATENT DOCUMENTS

| | | |
|---|---|---|
| CN | 109508923 A | 8/2016 |
| CN | 106056345 A | 10/2016 |
| CN | 107423923 A | 12/2017 |
| CN | 107730314 A | 2/2018 |
| CN | 108319893 A | 7/2018 |
| JP | 2019-058334 | 4/2019 |
| KR | 10-1672887 | 11/2016 |
| KR | 10-2018-0029012 | 3/2018 |
| KR | 10-2018-00545511 A | 5/2018 |

OTHER PUBLICATIONS

Hong Kong Office Action dated Mar. 2, 2022, in counterpart Hong Kong Application No. 22021024460.8 (7 pages).
Taiwan Office Action dated Feb. 24, 2022, in counterpart Taiwan Application No. 109145788 (11 pages).
Office Action dated Jul. 12, 2021, by the Taiwanese Patent Office in counterpart Taiwanese Application No. 109145788, 19 pages.
Notice of Preliminary Rejection dated Jul. 21, 2021, by the Korean Patent Office in counterpart Korean Application No. 10-2020-0054753, 9 pages.
International Search Report and Written Opinion for counterpart application No. PCT/IB2020/062332 dated Apr. 1, 2021 (7 pages).

* cited by examiner

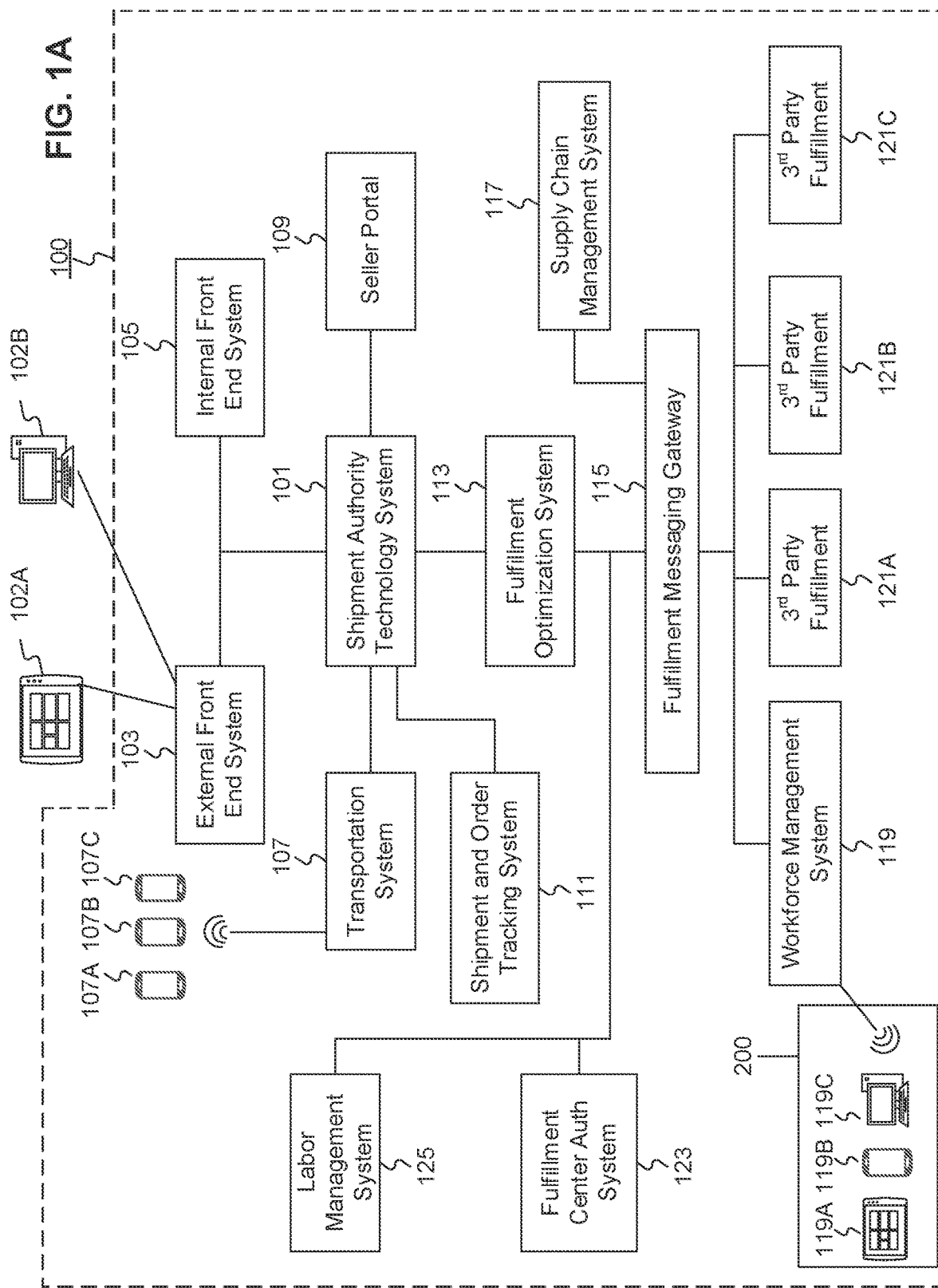

login  Sign Up  Service center

Category | Cheese | ? | 🛒

My Orders  Shopping Cart all 'Cheese' (65,586)          Gift Cards filter

☐ Fast Delivery
☐ Imported Product 65,586 results for 'Cheese'
Related searches: Sliced cheese  baby cheese  cheddar cheese
string cheese  butter  pizza cheese  cream cheese  cheese stick
cubed cheese  parmesan cheese 6 per page category
All
Food
Silverware
Kitchen utensils
Home electronics digital
Household goods
  View more brands
  Local Milk
  Daily dairy
  Cattle and trees
View more scope
All stars
  4 or more
  3 or more
  2 or more
  1 or more

CHEDDAR

FREE Shipping
Sliced cheese, 18g,
100 pieces
(88 won per 10 g)
Morning (Thursday)
(1294)

LOCAL FARM MILK

Mozzarella cheese,
1kg, 2 pieces
🚀
(103 won per 10 g)
Tomorrow (Wed)
(285)

100 grams of cheddar
sliced cheese,
18 grams, 100 pieces
(73 won per 10 g)
Morning (Thursday)
(862)

REAL GRATED PARMESAN

Grated Parmesan
Cheese, 85g, 1 piece
🚀
(389 won per 10g)
Tomorrow (Wed)
(839)

Mozzarella cheese,
1 kg, 1
(85 won per 10g)
Morning (Thursday)
(379)

Cheese Heads String

FREE Shipping
1.36 kg of string
cheese
Morning (Thursday)
(337)

FIG. 1B

Order / Payment    Shopping Cart> Order Payment> Order Completion

Buyer Information
- name
- e-mail
- Mobile Phone Number  0123456789  [    ]

Recipient information    [Change shipping address]
- name    (default shipping)
- Shipping address
- Contact
- Delivery Request  Front door  [change]

Shipping 1 out of 1

Tomorrow (Thursday) 11/29 arrival guarantee
Mozzarella cheese, 1kg, 2 pieces            1 quantity / free shipping            Fast Delivery Billing Information
- Total product price   $20.00
- discount coupon   0    No applicable discount coupons available.
- shipping fee   0
- MyCash   0
- Total payment amount   $20.00 – MyCash to be credited $0.40
- Payment Method   ⦿ ⛁ Rocket Transfer  (2% off)   ○ ⛁ Rocket credit/check card    ○ Credit/Check Card
                        ○ Cellphone  ○ Bank transfer (virtual account)

Select bank [Selection ▼]

☐ I agree to use future payments with the selected payment method (Selection)

Cash receipts
☐ Apply for cash receipt

*A cash receipt will be issued for the amount of cash deposited at the time of settlement of cash.

I have confirmed the order above and agree to the payment.

[ Place Order ]

| Category | Violation Type | Site A | Site B | Site C | Penalty |
|---|---|---|---|---|---|
| Address Related | Wrong address | 1.00 | | | 1.00 |
| | Delivered but not received | 0.75 | | | - |
| Package Condition Related | Product damaged on arrival | | 0.50 | | 0.50 |
| | Product damaged on arrival (QR) | 0.25 | 0.25 | | 0.25 |
| Receiving Method Related | Common entrance | | | 0.75 | 0.75 |
| | Improper delivery location (QR) | | | 0.50 | - |
| | Delivered to common entrance at a known community | | | 0.50 | - |
| | Delivered to common entrance against recipient request | | 0.25 | | 0.25 |
| Penalty | | 1.25 | 0.75 | 0.75 | 2.75 |

FIG. 7

SYSTEMS AND METHODS FOR QUALITY CONTROL OF WORKER BEHAVIOR USING A NON-LINEAR FAULT SCORING SCHEME

RELATED APPLICATIONS

This application is a continuation of U.S. patent application Ser. No. 16/821,661 (now allowed) filed on Mar. 17, 2020, which is hereby incorporated by reference in the present application.

TECHNICAL FIELD

The present disclosure generally relates to computerized methods and systems for quality control of worker behavior using a non-linear fault scoring scheme. In particular, embodiments of the present disclosure relate to inventive and unconventional systems that use a non-linear fault scoring scheme to generate ratings for a group of workers so as to motivate them to adhere to certain guidelines.

BACKGROUND

In today's hypercompetitive world, businesses constantly compete for market share. Customer experience plays a major part in maintaining and increasing the market share. However, building a positive customer experience is difficult, and it is even harder for the positive customer experience to translate to a measurable success because satisfied customers do not often leave a review or a rating to show their experience. On the other hand, it is relatively much easier for negative customer experiences to mar public relations or stellar ratings because dissatisfied customers are often vocal, taking their grievances to social media or leaving unreasonably unfavorable reviews.

Therefore, many companies have established guidelines for interacting with customers. The guidelines help customer-facing workers perform their assigned tasks in a methodical manner and help companies ensure a consistent experience for a majority of their customers. Shipping companies, for example, have guidelines on how to deliver packages to recipients, how to interact with recipients when they are present to receive packages in person, and what to do when recipients are not present.

Mere dissemination of the guidelines, however, is insufficient to ensure compliance from workers. Previous approaches to promoting compliance have included, for example, receiving individualized feedback from aggrieved customers and taking corrective actions with responsible workers; and implementing a list of actions that a worker must perform and holding periodic reviews on adherence to the list. However, such approaches require a lot of time to review and to provide feedback to the worker.

Current electronic systems for ensuring worker compliance and quality control of worker behavior are also deficient. Attempts to consolidate compliance data from multiple sources (e.g., customer feedback, checklist) remain difficult due to the wide spectrum of input. For example, customer feedback may involve anything that was not up to the customer's satisfaction, including items not covered by the guidelines. Furthermore, periodic reviews that inform a worker of non-compliance still allows the worker to repeat the same violation until the next review, risking even further grievances by the same customers previously aggrieved by the worker.

Existing electronic systems are also configured to operate on a predetermined set of parameters (e.g., relative importance of different violations, periods for review), which cannot be changed in the middle of a review cycle and do not allow simulation of different scenarios (e.g., how workers' performance metrics change based on different parameters, how customer experience metrics change based on different parameters), etc.

Therefore, there is a need for improved methods and systems for quality control of worker behavior that offer timely feedback to individual workers and for a flexible tool for managers to manage quality control parameters.

SUMMARY

One aspect of the present disclosure is directed to a computer-implemented system for quality control of worker behavior. The system may comprise: a memory storing instructions; and at least one processor configured to execute the instructions. The instructions may comprise: receiving a data set associating a plurality of violations with a plurality of delivery sites, wherein each violation in the plurality of violations is associated with a delivery site and the violations are organized into one or more violation categories; filtering the data set to obtain a subset of violations reflective of a current worker behavior; for each violation category, identifying a first violation from the filtered data set associated with the violation category, the first violation being associated with a highest penalty; determining a rating based on the first violation identified for each violation category; and transmitting the rating to a remote device associated with a delivery worker responsible for the violations.

Another aspect of the present disclosure is directed to a computer-implemented method for quality control of worker behavior. The method may comprise: receiving a data set relating associating a plurality of violations to with a plurality of delivery sites, wherein each violation in the plurality of violations is associated with a delivery site and the plurality of violations are organized into one or more violation categories; filtering the data set to obtain a subset of violations reflective of a current worker behavior; for each violation category, identifying a first violation from the filtered data set associated with the violation category, the first violation being associated with a highest penalty; determining a rating based on the first violation identified for each violation category; and transmitting the rating to a remote device associated with a delivery worker responsible for the plurality of violations.

Yet another aspect of the present disclosure is directed to a computer-implemented system for quality control of worker behavior. The system may comprise a mobile device and a server. The mobile device may comprise: an image sensor; a first memory storing first instructions; and at least one first processor configured to execute the first instructions. The first instructions may comprise: scanning an identifier associated with a first delivery site via the image sensor; generating an image data via the image sensor, wherein the image data comprises metadata containing location data associated with the first delivery site; receiving a user interaction with the mobile device confirming completion of a delivery for the delivery site; and transmitting the image data to the server. The server may comprise: a second memory storing instructions; and at least one second processor configured to execute the second instructions. The second instructions may comprise: receiving a data set relating a plurality of violations to a plurality of delivery sites, wherein each violation of the plurality of delivery sites is associated with a delivery site, wherein the plurality of violations are organized into one or more violation categories, and wherein the data set includes data relating a first violation to the first delivery site; filtering the data set to obtain a subset of violations reflective of a worker behavior; for each violation category, identifying a first violation from the filtered data set associated with the violation category, the first violation being associated with a highest penalty; determining a rating based on the first violation identified for each violation category; and transmitting the rating to the mobile device.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1B depicts a sample Search Result Page (SRP) that includes one or more search results satisfying a search request along with interactive user interface elements, consistent with the disclosed embodiments.

FIG. 1E depicts a sample Order page that includes items from the virtual shopping cart along with information regarding purchase and shipping, along with interactive user interface elements, consistent with the disclosed embodiments.

FIG. 7 is a table showing an exemplary scenario for determining a rating.

DETAILED DESCRIPTION

Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods that use a non-linear fault management scheme to generate ratings for a group of workers to motivate them to adhere to certain guidelines. Managers of the workers can use the ratings to incentivize or penalize the workers for certain behaviors, thus being able to establish quality control over workers' behaviors.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
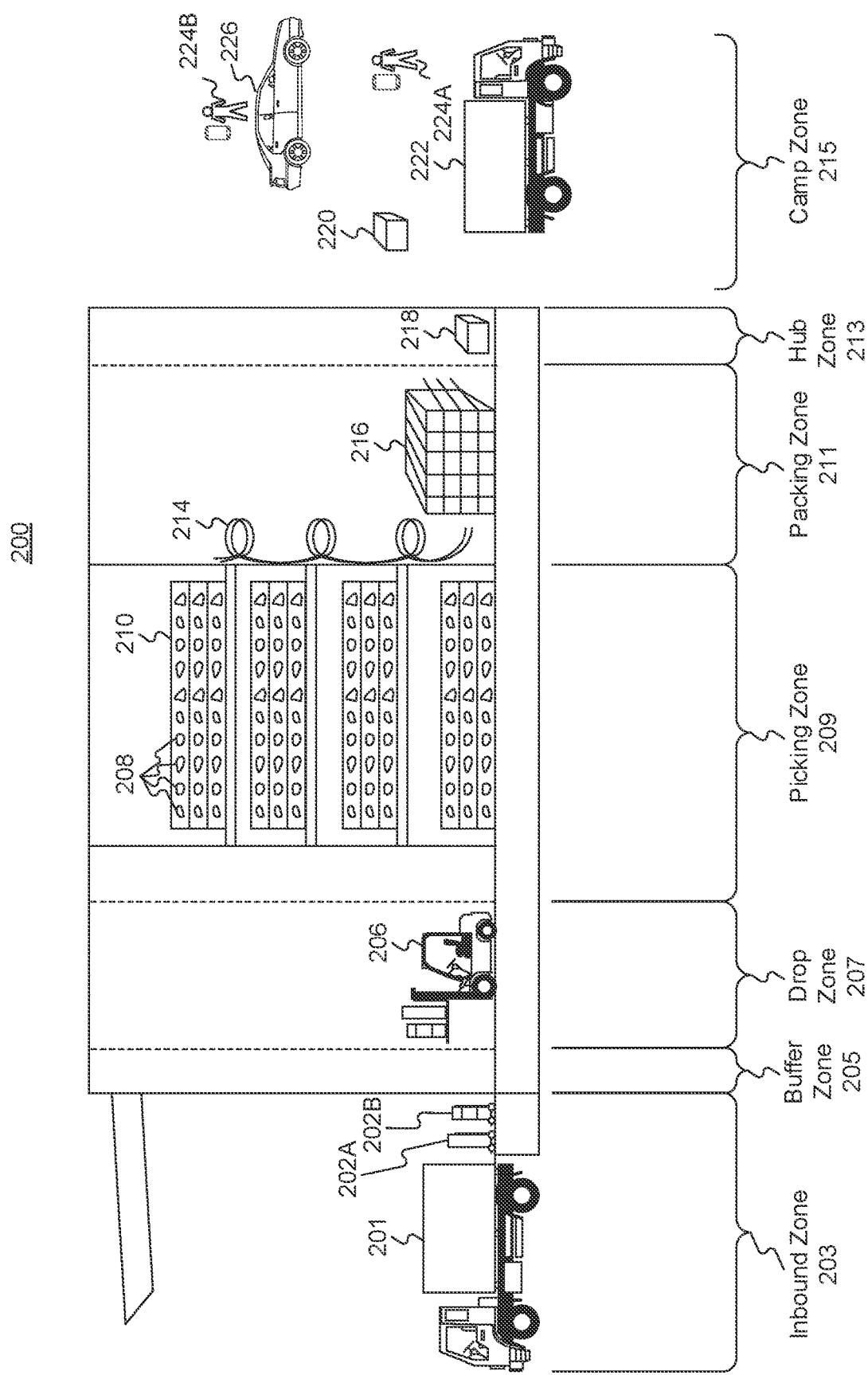
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
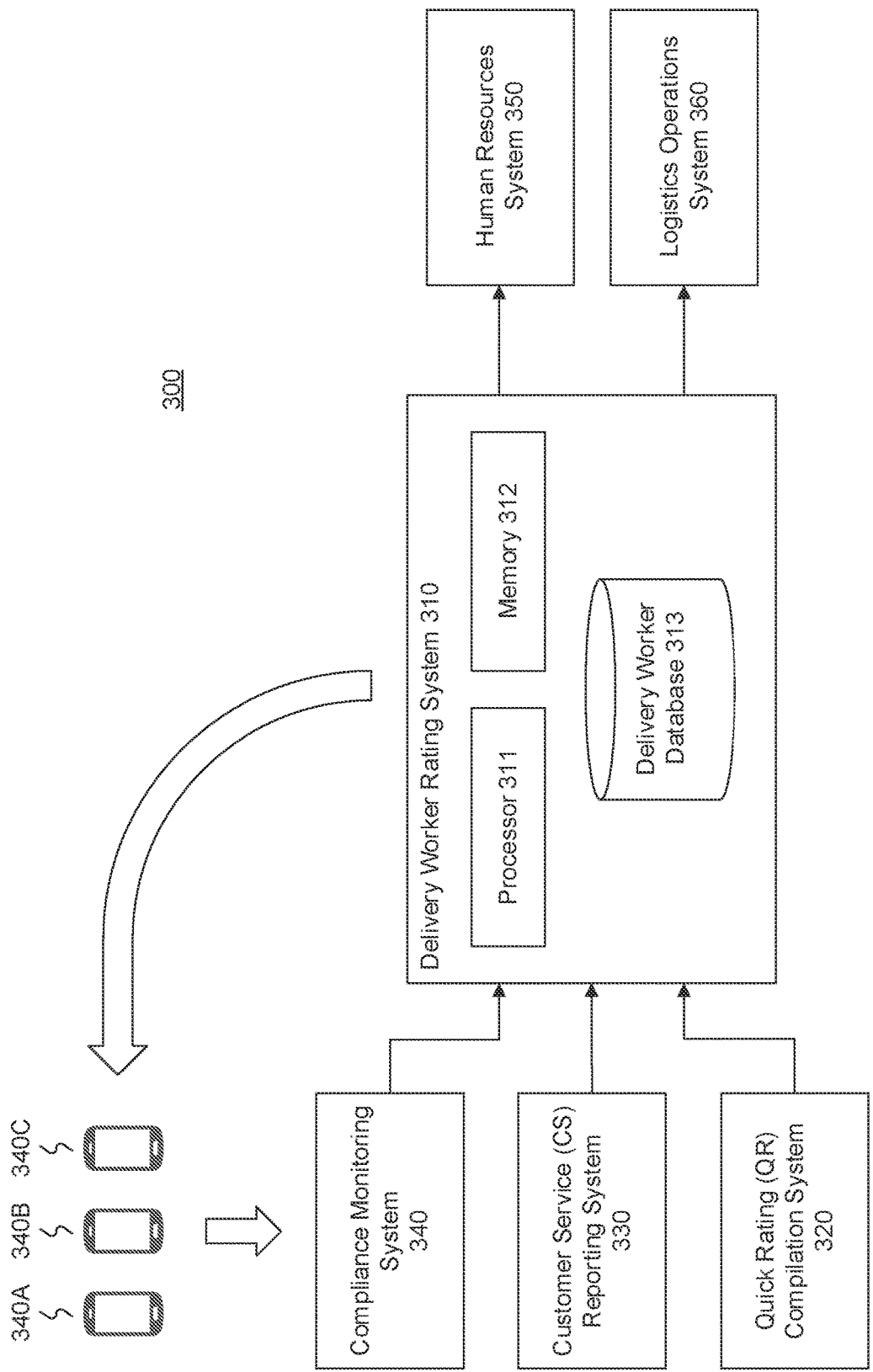
FIG. 3 is a schematic block diagram illustrating an exemplary embodiment of a computerized system for implementing a worker behavior quality control scheme, consistent with the disclosed embodiments.

FIG. 3 depicts a schematic block diagram illustrating an exemplary embodiment of a computerized system 300 for implementing a worker behavior quality control scheme. The exemplary embodiment comprises a delivery worker rating system 310 along with a compliance monitoring system 340, a customer service (CS) reporting system 330, and a quick rating (QR) compilation system 320 that serve as sources of information; and a human resources system 350 and logistics operations system 360 that utilize the output from the delivery worker rating system 310.

In some embodiments, each of the elements depicted in FIG. 3 may represent a group of systems, individual systems in a network of systems, functional units or modules inside a system, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11a/b/g/n Standards, a wired network, or the like.

Delivery worker rating system 310, in some embodiments, may be implemented as a computer system that aggregates delivery log data and delivery quality data, processes them to determine delivery worker ratings, and transmits the ratings to other systems and devices. As used herein, delivery log data may comprise data associated with deliveries performed by delivery workers. The list may also store various parameters associated with the deliveries, such as delivery worker identifier of the delivery worker that performed the delivery, address of the delivery site, package identifiers of the packages delivered for the delivery, or the like. Delivery quality data may comprise data associated with quality violations (as defined below) that occurred during the deliveries stored in the delivery log data.

In some embodiments, delivery worker rating system 310 may comprise one or more processors 311, one or more memories 312 (i.e., non-transitory computer-readable media), and a delivery worker database 313. Delivery worker rating system 310 may take the form of a server, general-purpose computer, a mainframe computer, a special-purpose computing device, a distributed computing system, or the like. Delivery worker rating system 310 may be a standalone system, or it may be part of a subsystem, which may be part of a larger system.

Delivery worker database 313 may be implemented as a database configured to serve as a repository of present and past records of delivery workers and their ratings. In some embodiments, delivery worker database 313 may comprise one or more hard disk drives, one or more solid state drives, one or more non-transitory memories, or any combination thereof. In some embodiments, delivery worker database 313 may also comprise a distributed network of databases providing redundancy, increased storage capacity, and/or ability to support multiple users simultaneously.

In some embodiments, delivery worker database 313 may be a relational database where data stored therein are organized in one or more tables representing, for example, delivery workers, delivery tasks, or delivery sites. By way of example, a table representing a delivery worker may comprise various parameters attributable to each delivery worker such as his/her name, employee identifier, employee type (e.g., full-time or part-time), delivery preference, or the like. As another example, a table representing a delivery worker's performance may comprise a historical list of delivery tasks he/she completed. The list may include various parameters attributable to each delivery such as address of a corresponding delivery site, delivery site identifier, delivery site type (e.g., single-family home, condominium, apartment, business, building), identifiers of delivered packages, any identified quality violations, or the like. Delivery worker database 313 may also store other tables or records suitable for meeting the needs of the quality control process as needed.

In some embodiments, delivery worker rating system 310 may store in delivery worker database 313 a plurality of quality violations from delivery quality data supplied by QR compilation system 320, CS reporting system 330, and compliance monitoring system 340. Each quality violation may be associated with a particular delivery task performed by a particular delivery worker. As used herein, a delivery task may refer to a delivery worker's act of delivering one or more packages to a delivery site (e.g., as represented by an address).

A quality violation may refer to a violation of a guideline identified as being attributable to a delivery worker. In some embodiments, QR compilation system 320, CS reporting system 330, and compliance monitoring system 340 may divide quality violations into one or more categories, for example, address related violations, package condition related violations, worker behavior related violations, receiving method related violations, and miscellaneous violations. In some embodiments, delivery worker rating system 310 may further divide each category into different violation types as exemplified below in Tables 1-5. In such embodiments, each violation type may be assigned a predetermined amount of penalty, which may be used to determine ratings as explained below. It is to be understood that the violation types illustrated below are exemplary and non-limiting. Violation types other than those identified below are also contemplated.

TABLE 1

Exemplary Violation Types for Address Related Violations

| Violation Type | Source System | Description |
| --- | --- | --- |
| Wrong address | CS Reporting System 330 | Complaint received: Delivered to the wrong address |
| Delivered but not received | CS Reporting System 330 | Complaint received: Delivered but not received |
| Lost product | CS Reporting System 330 | Complaint received: Lost product |
| Item missing | CS Reporting System 330 | Complaint received: Item missing (requested re-delivery) |
| Product not received (QR) | QR Compilation System 320 | Negative indication received: Product not received |

TABLE 2

Exemplary Violation Types for Package Condition Related Violations

| Violation Type | Source System | Description |
| --- | --- | --- |
| Product damaged on arrival | CS Reporting System 330 | Complaint received: Product damaged on arrival |

TABLE 2-continued

Exemplary Violation Types for Package Condition Related Violations

| Violation Type | Source System | Description |
|---|---|---|
| Packaging damaged on arrival | CS Reporting System 330 | Complaint received: Packaging damaged on arrival |
| Product damaged on arrival (QR) | QR Compilation System 320 | Negative indication received: Product damaged on arrival |

TABLE 3

Exemplary Violation Types for Worker Behavior Related Violations

| Violation Type | Source System | Description |
|---|---|---|
| Police report | CS Reporting System 330 | Complaint received: Police report received |
| Altercation | CS Reporting System 330 | Complaint received: Delivery worker got into a fight |
| Driving/parking manner on premises | CS Reporting System 330 | Complaint received: Improper driving or parking behavior on premises |
| Appearance | CS Reporting System 330 | Complaint received: Unprofessional attire |
| Speech and behavior | CS Reporting System 330 | Complaint received: Unprofessional speech or behavior |
| Damage to property | CS Reporting System 330 | Complaint received: Damaged customer's property |
| Trespassing | CS Reporting System 330 | Complaint received: Trespassed onto recipient's property |
| Swearing | CS Reporting System 330 | Complaint received: Swearing |
| Customer privacy misuse | CS Reporting System 330 | Complaint received: Misused or abused customers' private information |
| Delivery vehicle | CS Reporting System 330 | Complaint received: Miscellaneous issues with the delivery vehicle |
| Traffic incident | CS Reporting System 330 | Complaint received: Caused a traffic incident |
| Smoking | CS Reporting System 330 | Complaint received: Smoked during work hours |
| Driving manner on road | CS Reporting System 330 | Complaint received: Unprofessional driving manner on road |
| Sexual harassment | CS Reporting System 330 | Complaint received: Sexual harassment |
| Unfriendly (QR) | QR Compilation System 320 | Negative indication received: Delivery worker unfriendly |

TABLE 4

Exemplary Violation Types for Receiving Method Related Violations

| Violation Type | Source System | Description |
|---|---|---|
| Common entrance | CS Reporting System 330 | Complaint received: Use of non-designated entrance |
| Improper delivery location (QR) | QR Compilation System 320 | Negative indication received: Package left at a wrong or inconvenient location |
| Delivered to common entrance at a known community | Compliance Monitoring System 340 | Violation detected: Package was left at a common entrance (e.g., front gate, common entrance of an apartment) when the delivery worker should have known how to pass the common entrance and deliver to door |
| Delivered to common entrance against recipient request | Compliance Monitoring System 340 | Violation detected: Package was left at a common entrance against recipient's explicit request |
| Delivered to common entrance at a partner community | Compliance Monitoring System 340 | Violation detected: Package was left at a common entrance when the delivery worker had the master key and should have been able to deliver to door |

TABLE 4-continued

Exemplary Violation Types for Receiving Method Related Violations

| Violation Type | Source System | Description |
|---|---|---|
| Delivered to common entrance under other circumstances | Compliance Monitoring System 340 | Violation detected: Package was left at a common entrance in spite of other circumstances that would have allowed delivery to door |

TABLE 5

Exemplary Violation Types for Miscellaneous Related Violations

| Violation Type | Source System | Description |
|---|---|---|
| Non-compliance to delivery requests | CS Reporting System 330 | Complaint received: Recipient's explicit request not honored |
| Manner of verification | CS Reporting System 330 | Complaint received: Delivery worker did not properly verify that no one was present to accept packages |
| Image omitted | CS Reporting System 330 | Complaint received: Delivery proof image was not received |
| Other reasons (QR) | QR Compilation System 320 | Negative indication received: Other reasons |

In some embodiments, each violation type may be associated with a predetermined penalty amount. The penalties may be preconfigured by an administrator based on various factors, for example, intentionality of the violation on the part of the delivery worker and/or seriousness of the violation. For example, penalty amounts may range between 0.01 and 1.00 for cases in which the maximum or perfect rating is represented by a score of 5.0. In further embodiments, delivery worker rating system 310 may include a UI for changing the penalty amounts as desired.

Each source system, for example, QR compilation system 320, CS reporting system 330, and compliance monitoring system 340 is described below.

QR compilation system 320 may be implemented as a computer system configured to receive customer feedback for each delivery task via external front end system 103. For example, external front end system 103 may comprise a mobile app or a website where recipients can submit a positive or negative rating (e.g., thumbs up/down, a score out of 5, etc.) in order to show the recipients' satisfaction or dissatisfaction. External front end system 103 may also ask recipients to indicate a reason for the rating from a predetermined list of reasons, which may help to organize the ratings into appropriate subcategories. QR compilation system 320 may be configured to convert each negative rating and the accompanying reason into a quality violation. By way of example, each of the reasons in the predetermined list of reasons may be mapped to a violation type, and converting the negative rating into a quality violation may comprise generating a quality violation of the corresponding violation type. Exemplary violation types reported by QR compilation system 320, such as "product not received (QR)," "product damaged on arrival (QR)," and "unfriendly (QR)," are listed at the end of Tables 1-3. Once the quality violations are generated, QR compilation system 320 may transmit them to delivery worker rating system 310 as delivery quality data. Such transmission may occur periodically or in real-time as each quality violation is generated.

CS reporting system 330 may be implemented as a computer system configured to receive complaints from customers using customer service representatives. CS reporting system 330 may convert such complaints into quality violations based on the reasons submitted with the complaints automatically or with the aid of customer service representatives. Some exemplary violation types reported by CS reporting system 330 are listed in Table 1. Once the quality violations are generated, CS reporting system 330 may transmit them to delivery worker rating system 310 as delivery quality data. Such transmission may occur periodically or in real-time as each quality violation is generated.

Compliance monitoring system 340 may be implemented as a computer system configured to aggregate delivery log data from delivery worker devices 340A-340C and analyze the delivery log data to determine delivery quality data, which may then be transmitted to delivery worker rating system 310. In some embodiments, compliance monitoring system 340 may be a standalone system, a member system among a group of networked systems, or a functional unit within another system such as transportation system 107.

In some embodiments, a structure and functions of compliance monitoring system 340 may be substantially similar to the those of transportation system 107 or a portion of thereof. As explained above with respect to FIG. 1A, delivery workers, who may be permanent, temporary, or shift employees, may utilize delivery worker devices 340A-340C (e.g., mobile devices 107A-107C) to effect delivery of packages containing the products ordered by customers. Upon arriving at a delivery location, a delivery worker may locate the one or more packages (e.g., in the back of a truck or in a crate of packages), scan or otherwise capture data associated with an identifier on the one or more packages (e.g., a barcode, an image, a text string, an RFID tag, or the like) using a delivery worker device (e.g., 340A) that may include an appropriate input device (e.g., image sensor, barcode reader, RFID reader), and deliver the one or more packages (e.g., by leaving it at a front door, leaving it with a security guard, handing it to the recipient, or the like). In some embodiments, the delivery worker may capture one or more photos of the one or more packages and/or may obtain a signature from a recipient (e.g., customer, security guard, etc.) using the delivery worker device 340A. The delivery worker device 340A may send information to transportation system 107 including information about the delivery, including, for example, timestamp, date, GPS location, photo(s), an identifier associated with the delivery worker, an identifier associated with the delivery worker device 340A, or the like.

In some embodiments, compliance monitoring system 340 may be configured to use information from delivery worker device 340A after completion of a delivery task to determine adherence to predetermined conditions based on guidelines. For example, a delivery worker may be required to submit a photo of delivered packages when a recipient is not present to receive the packages in person. In such cases, compliance monitoring system 340 may parse all delivery completion data received from delivery worker devices 340A-340C to identify delivery tasks where a recipient was not present and detect a violation where the corresponding delivery completion data does not include a photo. Similar violation types reported by compliance monitoring system 340 are listed in Table 5 as additional examples. Once the quality violations are generated, compliance monitoring system 340 may transmit them to delivery worker rating system 310 as delivery quality data. Such transmission may occur periodically or in real-time as each quality violation is generated.

In another example, some recipients may live in a multi-unit structure (e.g., an apartment complex, building) with a secured common entrance. In such cases, the manager of the multi-unit structure may have entered into an agreement with the shipping company to provide a master key; or some recipients located within the multi-unit structure may have made explicit requests (via, e.g., external front end system 103) to deliver packages to their door and provided their personal access code. The guideline may direct delivery workers to use the master key or personal access codes and deliver to respective recipients' doors in such cases. However, upon parsing delivery completion data received from delivery worker devices 340A-340C that delivered to such recipients, compliance monitoring system 340 may detect that GPS location data associated with certain delivery tasks do not correspond to the proper/desired delivery site (i.e., recipient's unit). Additionally or alternatively, compliance monitoring system 340 may employ an image recognition algorithm or manual review of random samples to determine that photos associated with certain delivery tasks do not show a door of a single unit. In both cases, compliance monitoring system 340 may detect a violation and record it as a quality violation. Similar violation types are listed in Table 4 as additional examples.

In further embodiments, compliance monitoring system 340 may be configurable to create custom violation types based on a plurality of conditions. For example, compliance monitoring system 340 may detect a violation where (1) a recipient has made an explicit request to deliver a package to his/her unit; (2) but the photo indicates that the package was dropped off at a common entrance instead; (3) and the delivery was completed during normal business hours. In this case, all three conditions must be satisfied in order for compliance monitoring system 340 to detect a violation. Absence of even just one condition (e.g., delivery was completed outside of normal business hours) may indicate that the delivery worker could not pass the common entrance and was forced to leave the package at the common entrance.

As explained above, each quality violation detected by compliance monitoring system 340, reported in a customer complaint received by CS reporting system 330, or received as a negative indication by QR compilation system 320 may be organized into delivery quality data by respective systems. Delivery worker rating system may then receive the delivery quality data along with delivery log data from compliance monitoring system 340 and store them in delivery worker database 313.

Such processes may occur in real-time as each system receives new data (e.g., new delivery completion data from delivery worker devices 340A-340C, new customer complaint, new negative indication). This may allow a rapid feedback cycle, where delivery workers may be notified of any violations they may have committed. Such rapid feedback may facilitate prompt correction of delivery worker behavior and overall improvement of delivery worker behavior.

Once delivery worker rating system 310 has processed all delivery log data and delivery quality data from the source systems and determined ratings for the delivery workers, delivery worker rating system 310 may transmit the ratings to various systems such as delivery worker devices 340A-340C, human resources system 350, and logistics operations system 360.

In some embodiments, delivery worker rating system 310 may send the ratings to corresponding delivery workers by transmitting the ratings to their respective delivery worker devices 340A-340C. Alternatively or additionally, delivery worker rating system 310 may send the ratings to respective delivery worker's desired device (e.g., personal mobile phone). Exemplary embodiments of user interfaces (UIs) for displaying the rating and receiving delivery worker's inputs will be described below with respect to FIG. 5.

Delivery worker rating system 310 may also transmit lists of delivery tasks and their associated violations to respective delivery worker devices 340A-340C so that delivery workers can review past delivery tasks. Providing such transparency may reduce any anxiety or confusion associated with not knowing how delivery workers themselves are reviewed.

Human resources system 350 and logistics operations system 360, in some embodiments, may be similar in structure and function to one or more systems depicted in FIG. 1A. In other embodiments, human resource system 350 and logistics operations system 360 may each be one or more computer systems configured to use the ratings of the delivery workers to fulfil other business needs such as providing managers the ability to review quality of delivery workers and award/penalize the delivery workers as appropriate. In some embodiments, the managers may use the ratings for incentive and performance evaluations via human resources system 350 or for issuing warnings via logistics operations system 360.

In further embodiments, logistics operations system 360 may use the ratings to rank delivery workers based on their rating and area of delivery. Logistics operations system 360 may then use the rank information to prioritize delivery task assignments for delivery workers. For example, delivery workers with higher ratings may receive more delivery tasks that are aligned with their desired area, while those with lower ratings may receive delivery tasks that fall outside of their desired area.

Figure 4:
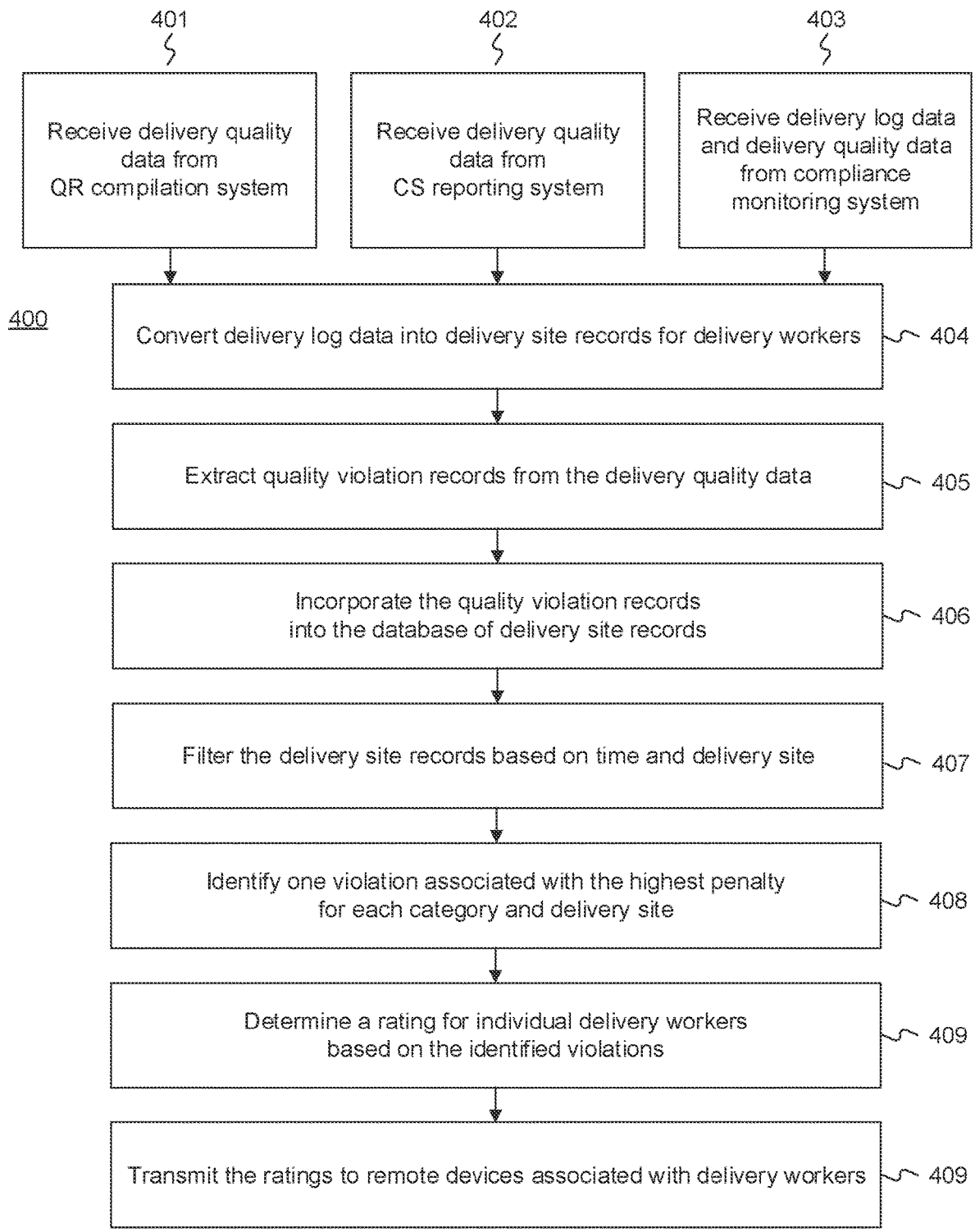
FIG. 4 is a flowchart of an exemplary computerized process of the worker behavior quality control scheme, consistent with the disclosed embodiments.

FIG. 4 depicts a flowchart of an exemplary process 400 of the worker behavior quality control scheme. In some embodiments, process 400 may be performed by delivery worker rating system 310 with the aid of other systems depicted in computerized system 300 above.

At steps 401-403, delivery worker rating system 310 may receive delivery quality data extracted from customer negative ratings via QR compilation system 320; delivery quality data extracted from customer complaints via CS reporting system 330; and delivery log data and delivery quality data from compliance monitoring system 340. In some embodiments, the delivery log data and delivery quality data may be collected and prepared by respective systems in the manner described above.

At step 404, delivery worker rating system 310 may convert the delivery log data into delivery site records for individual delivery workers, organized by delivery sites. As used herein, a delivery site record of a delivery worker may comprise a list of delivery sites to which the delivery worker delivered at least one package to, regardless of whether there is a quality violation associated with the delivery. Each delivery site in a delivery site record of a delivery worker may also comprise a list of delivery tasks that the delivery worker completed for the delivery site, so that corresponding quality violations, if any, can be correctly assigned in the manner described below.

Delivery worker rating system 310 may store the delivery site records in delivery worker database 313. In some embodiments, this set of delivery site records may serve as a base data set with which delivery workers' performances are measured. In further embodiments where delivery worker database 313 already has an established database of delivery site records, delivery worker rating system 310 may update or append the existing delivery site records to include new information contained in the delivery log data.

At step 405, delivery worker rating system 310 may extract quality violations from the delivery quality data received from the three source systems (i.e., QR compilation system 320, CS reporting system 330, compliance monitoring system 340). Delivery worker rating system 310 may then, at step 406, incorporate the violation records into the database of delivery site records, associating each quality violation to a corresponding delivery site record where the violation occurred. In some embodiments, delivery worker rating system 310 may incorporate each violation record by matching one or more of the delivery site, delivery worker, and timestamp of a violation record to an entry among the delivery site records.

At step 407, delivery worker rating system 310 may filter the delivery site records to prepare for determining ratings for delivery workers. In some embodiments, filtering the delivery site record may comprise identifying a portion of the record that fall within a predetermined period of time (e.g., past 60 days, a range of dates). This may allow the ratings to reflect only recent quality violations, which may result in a more accurate representation of the delivery worker's current behavior. Additionally or alternatively, filtering the delivery site record may comprise identifying a portion of the record associated with delivery workers that have delivered to more than a predetermined number of delivery sites (e.g., more than 40 sites). This may prevent judging delivery workers with an insufficient number of deliveries, which may skew their respective ratings.

At step 408, delivery worker rating system 310 may consolidate each category of quality violations to identify one quality violation from each category for each delivery site and delivery worker. In some embodiments, the identified quality violation may be associated with a highest amount of penalty compared to the other quality violations at the same delivery site by the same delivery worker and in the same category.

Referring back to Table 3, for example, consider a situation where a delivery worker caused damage to property during delivery to a particular delivery site on one day, received a parking citation during delivery to the same delivery site on another day, and got into a traffic accident during delivery to the same delivery site on yet another day. In this situation, the delivery worker may have three quality violations associated with the particular delivery site— "damage to property," "driving/parking manner on premises," and "traffic incident," respectively. In some embodiments, the three violation types may be associated with penalties of 0.75, 0.80, and 1.00, respectively. However, delivery worker rating system 310, at step 408, may identify the quality violation associated with the violation type of the highest penalty (e.g., traffic accident) and consolidate the three quality violations into just the one identified quality violation.

At step 409, delivery worker rating system 310 may determine ratings for the delivery workers based on the identified quality violations from each category. In some cases where a delivery worker delivers multiple packages to a particular delivery site over multiple visits, the delivery worker may make the same quality violation during each visit. In such cases, delivery worker rating system 310 may ignore duplicate violations made by the same delivery worker to the same delivery site. Similarly, when a delivery worker delivers packages to multiple delivery sites and makes the same quality violation at each delivery site, delivery worker rating system 310 may factor only one quality violation in determining the rating. Such a process may prevent a sudden decrease in the delivery worker's quality due to a single mistake.

The process of determining a rating is explained below in more detail using an exemplary scenario set forth in Table 700 of FIG. 7. The particular violation types, penalty amounts and ratings in Table 700 are presented only for illustrative purposes.

Table 700 represents exemplary quality violations of a delivery worker and corresponding penalty amounts. In this example, a delivery worker delivered to 150 distinct sites and made quality violations in the three categories (i.e., address related violations, package condition related violations, and receiving method related violations) at the three distinct sites (i.e., site A, site B, site C) shown above. Within each category, the delivery worker made quality violations as shown and no others. The penalty amounts that are factored into calculating the total penalty are highlighted, and their sums appear on the rightmost column and the bottom row. The quality violations shown represent those that remain after filtering the delivery site records at step 407 above and identifying the one violation associated with the highest penalty for each category and delivery site at step 408.

In the address related category, only "wrong address" violation between the two quality violations for Site A are factored into calculating the penalty. "Product damaged on arrival (QR)" violation for Site B is ignored for similar reasons. On the other hand, "wrong address" violation for Site A and "product damaged on arrival (OR)" violation for Site B are both added to the total penalty, because they are from two different categories. Furthermore, even though the delivery worker made "product damaged on arrival (QR)" violations for Site A and Site B, only one of them is added to the total penalty, because duplicate violations for different delivery sites are ignored.

In the end, delivery worker rating system 310 adds the penalties to arrive at a total penalty, which is then input into an equation for determining the rating. In some embodiments, the equation may be given by (perfect rating)−(total penalty)/(total number of distinct delivery sites in the chosen period of time)×100). Other equations or algorithms are also contemplated. The chosen period of time here refers to the period of time used to filter the delivery site records at step 407 above. Here, the rating may be 5−2.75/150×100=3.17. In some embodiments, delivery workers that did not meet the minimum number of delivery sites may be given a rating of 0.

At step 410, once all ratings have been determined, delivery worker rating system 310 may transmit the ratings to respective delivery worker devices (e.g., 340A-340C), human resources system 350, logistics operations system 360, or the like.

In some embodiments, delivery worker rating system 310 may perform computerized process 400 at a predetermined interval (e.g., once a day, every few hours) or as new delivery quality data and delivery log data become available.

Figure 5:
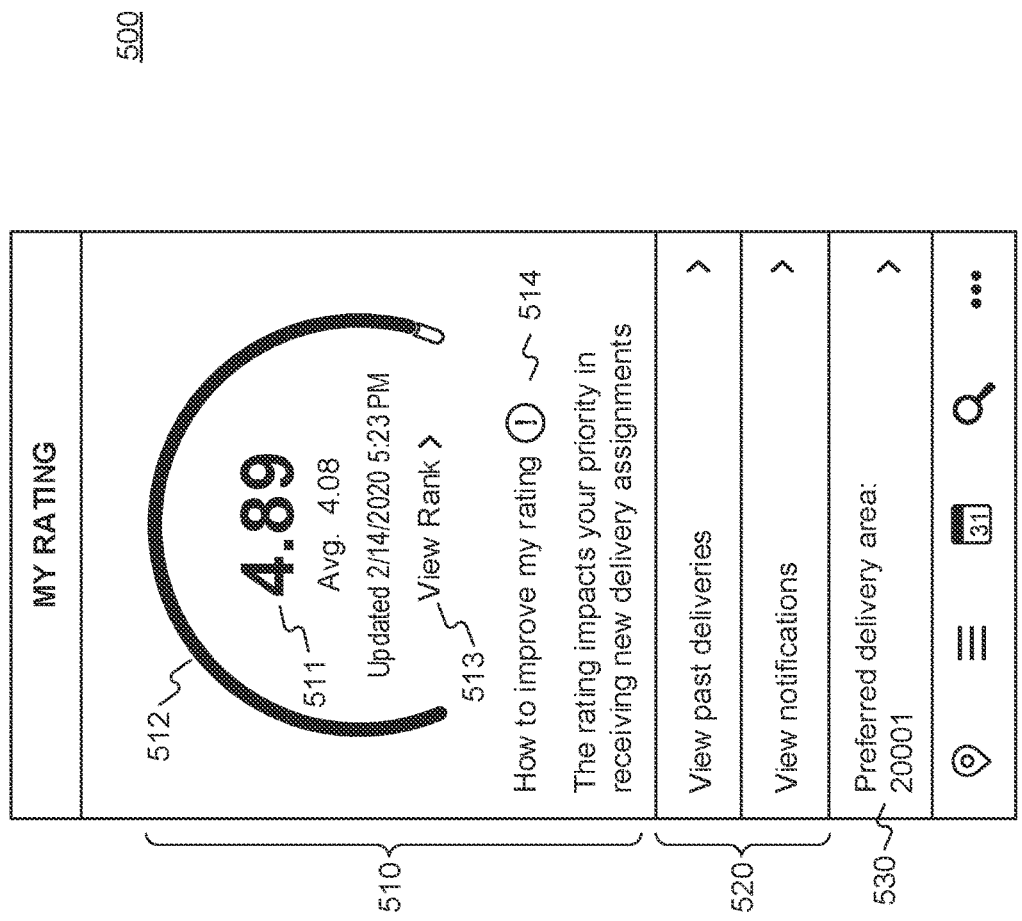
FIG. 5 is an exemplary embodiment of a rating display user interface (UI) for displaying a rating on a mobile device, consistent with the disclosed embodiments.

FIG. 5 depicts an exemplary embodiment of a rating display UI 500 for displaying a rating on a delivery worker device (e.g., 340A). Rating display UI 500 depicts an interface comprising of a rating section 510, a past records section 520, and a preference setting section 530.

In some embodiments, rating section 510 may comprise a numerical display 511 of the current rating and a bar graph 512 showing the current rating relative to the perfect score (e.g., 5.00). Rating section 510 may further display an average of all delivery workers for comparison, and/or a time the rating was last updated. In some embodiments, the bar graph may change its color based on a level of current rating 511, where colors closer to green may indicate a high rating and colors closer to red may indicate a low rating. In further embodiments, rating section 510 may also comprise a tier button 513 for displaying tier information (discussed below with respect to FIG. 6) and/or an advice button 514 for displaying an advice for improving the rating.

In some embodiments, the advice may include an explanation of how ratings are calculated and/or an explanation of possible quality violation items. Additionally or alternatively, the advice may include customized advice on specific types of violations. For example, delivery worker rating system 310 or delivery worker device (e.g., 340A) may perform statistical analyses on past quality violations of the delivery worker and identify violation types or categories with the most number of quality violations or those that are relatively easy to fix.

In some embodiments, past records section 520 may display, responsive to a user input, one or more of the delivery worker's past delivery records, past quality violations, past notifications, or the like. The level of detail available through rating display UI 500 may be adjustable by an administrator and may range from showing mere number of quality violations and delivery tasks to showing all available information such as, but not limited to, customer complaints that resulted in quality violations, delivery completion data, or the like. Providing high level of detail may offer transparency and allow delivery workers to assess their strengths and weaknesses.

In some embodiments, preference setting section 530 may display, responsive to a user input, one or more customizable parameters that the delivery worker can specify in communicating his/her preferences. For example, the delivery worker may specify a zip code to which he/she prefer to deliver, shifts he/she would like to work, or the like.

In some embodiments, rating display UI 500 may further comprise a game section (not shown) configured to display information relating to how the delivery worker's rating fares against other delivery workers. In such embodiments, delivery workers may compete with other delivery workers in a competitive setting, where delivery workers may be able to see ratings of their co-workers, compete for prizes, or the like. Such a competition system may provide more self-motivation than simply rewarding or penalizing delivery workers for high or low ratings.

Figure 6:
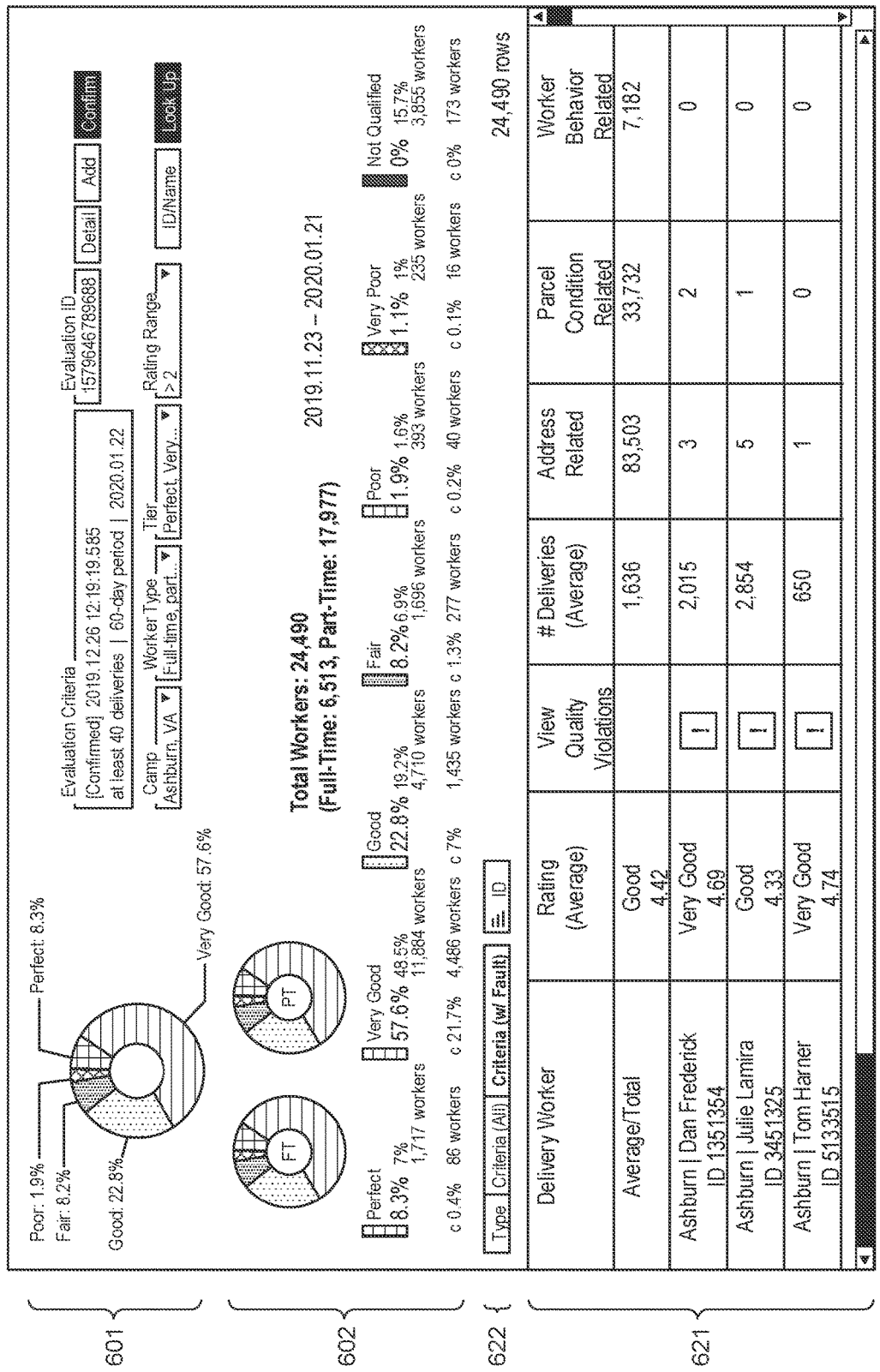
FIG. 6 is an exemplary embodiment of an admin tool UI for managing ratings of delivery workers, consistent with the disclosed embodiments.

FIG. 6 depicts an exemplary embodiment of an admin tool UI 600 for managing ratings of the delivery workers. In some embodiments, admin tool UI 600 may comprise a tier distribution graph 601, a detailed distribution section 602, rating system configurators 611, table 621 of delivery worker records, and table view configurators 622.

In some embodiments, tier distribution graph 601 and detailed distribution section 602 may display distribution of delivery workers as divided into one or more tiers. Delivery worker rating system 310 may divide delivery workers into one or more tiers based on their respective ratings. For example, admin tool UI 600 shows 5 tiers comprising perfect, very good, good, fair, and poor. Although 5 tiers are shown, the number of tiers is not so limited and admin tool UI 600 may show any number of tiers. In some embodiments, delivery worker rating system 310 may divide the tiers so that they roughly follow a bell curve. In other embodiments, the system may divide the tiers based on a predetermined percentage or a number of delivery workers per tier.

As shown in FIG. 6, tier distribution graph 601 may show the tier distribution of all delivery workers in a single pie graph, although other types of graphs or representations are also contemplated. Detailed distribution section 602 may show more details for each tier or show a plurality of graphs showing tier distribution among different delivery worker types (e.g., full-time or part-time).

In some embodiments, rating system configurators 611 may include one or more UI elements that may allow a user to adjust parameters for determining ratings or specify the delivery worker records he/she wishes to look up. For example, rating system configurator 611 may allow the user to adjust parameters for filtering the delivery site records based on, for example, the period of time, minimum number of delivery sites, penalty amounts associated with different violation types, or the like (first line of UI elements in rating system configurators 611). Rating system configurator 611 may also allow the user to specify search criteria for displaying a portion of delivery worker records (second line of UI elements in rating system configurators 611).

In some embodiments, adjusting the parameters using the first line of UI elements may return a different set of ratings and tier information based on the new parameters. Tier distribution section 601, detailed distribution section 602, and table 621 may update to show the new information.

In some embodiments, table 621 may display a list of delivery workers and associated delivery quality that meet the search criteria set using rating system configurators 611. Table view configurators 622 may add another degree of customizability, allowing the user to view select list of delivery workers. In some embodiments, table 621 may display each delivery worker information including his/her name, area of service, and employee identifier along with respective ratings, tier information, and a number of violations under each category. In further embodiments, table 621 may expand to show a number of violations under each violation type in response to a user input selecting each category, or show a list of quality violations associated with a delivery worker in response to a user input selecting the exclamation point buttons in table 621.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for quality control of worker behavior, the system comprising:
    a network of one or more remote devices;
    a memory storing instructions; and
    at least one processor configured to execute the instructions for:
        receiving a data set from the one or more remote devices, wherein the data set associates a plurality of violations with a plurality of delivery sites visited by the remote devices;
        identifying two or more violations from the data set, wherein the two or more violations have an impact on one or more quality measurements of a worker behavior;
        determining the one or more quality measurements of the worker behavior based on the two or more violations; and
        transmitting the one or more quality measurements of the worker behavior to a corresponding remote device to enable a rapid feedback cycle of the worker behavior.

2. The computer-implemented system of claim 1, wherein the plurality of violations are generated based on at least one of an operator generated record, feedback data received through a customer device, or geolocation and image data generated by the remote devices.

3. The computer-implemented system of claim 1, wherein the instructions further comprise:
    filtering the data set based on at least one of timestamps associated with the plurality of violations or a total number of delivery sites visited by a worker.

4. The computer-implemented system of claim 1, wherein the two or more violations are organized into one or more categories, the one or more categories being associated with the one or more quality measurements of the worker behavior.

5. The computer-implemented system of claim 1,
    wherein a first subset of the two or more violations is associated with a first category, the first subset comprising two or more categorized violations, and
    wherein the one or more quality measurements of the worker behavior are determined based on a selected violation of the two or more categorized violations.

6. The computer-implemented system of claim 5, wherein the selected violation is associated with a highest penalty among the two or more categorized violations.

7. The computer-implemented system of claim 1, wherein the instructions further comprise:

displaying a second subset of the two or more violations, based on which the one or more quality measurements were determined.

8. A computer-implemented method for quality control of worker behavior, comprising:

receiving a data set from one or more remote devices, wherein the data set associates a plurality of violations with a plurality of delivery sites visited by the remote devices;

identifying two or more violations from the data set, wherein the two or more violations have an impact on one or more quality measurements of a worker behavior;

determining the one or more quality measurements of the worker behavior based on the two or more violations; and transmitting the one or more quality measurements of the worker behavior to a corresponding remote device to enable a rapid feedback cycle of the worker behavior.

9. The computer-implemented method of claim 8, wherein the plurality of violations are generated based on at least one of an operator generated record, feedback data received through a customer device, or geolocation and image data generated by the remote devices.

10. The computer-implemented method of claim 8, further comprising:

filtering the data set based on at least one of timestamps associated with the plurality of violations or a total number of delivery sites visited by a worker.

11. The computer-implemented method of claim 8, wherein the two or more violations are organized into one or more categories, the one or more categories being associated with the one or more quality measurements of the worker behavior.

12. The computer-implemented method of claim 8, wherein a first subset of the two or more violations is associated with a first category, the first subset comprising two or more categorized violations, and wherein the one or more quality measurements of the worker behavior are determined based on a selected violation of the two or more categorized violations.

13. The computer-implemented method of claim 12, wherein the selected violation is associated with a highest penalty among the two or more categorized violations.

14. The computer-implemented method of claim 8, further comprising:

displaying a second subset of the two or more violations, based on which the one or more quality measurements were determined.

15. A non-transitory computer-readable medium storing a set of instructions that are executable by at least one processor to perform operations for quality control of worker behavior, the operations comprising:

receiving a data set from one or more remote devices, wherein the data set associates a plurality of violations with a plurality of delivery sites visited by the remote devices;

identifying two or more violations from the data set, wherein the two or more violations have an impact on one or more quality measurements of a worker behavior;

determining the one or more quality measurements of the worker behavior based on the two or more violations; and transmitting the one or more quality measurements of the worker behavior to a corresponding remote device to enable a rapid feedback cycle of the worker behavior.

16. The non-transitory computer-readable medium of claim 15, wherein the plurality of violations are generated based on at least one of an operator generated record, feedback data received through a customer device, or geolocation and image data generated by the remote devices.

17. The non-transitory computer-readable medium of claim 15, wherein the operations further comprise:

filtering the data set based on at least one of timestamps associated with the plurality of violations or a total number of delivery sites visited by a worker.

18. The non-transitory computer-readable medium of claim 15, wherein the two or more violations are organized into one or more categories, the one or more categories being associated with the one or more quality measurements of the worker behavior.

19. The non-transitory computer-readable medium of claim 15, wherein a first subset of the two or more violations is associated with a first category, the first subset comprising two or more categorized violations, and wherein the one or more quality measurements of the worker behavior are determined based on a selected violation of the two or more categorized violations.

20. The non-transitory computer-readable medium of claim 19, wherein the selected violation is associated with a highest penalty among the two or more categorized violations.

\* \* \* \* \*